(12) United States Patent
Baarman et al.

(10) Patent No.: US 8,593,105 B2
(45) Date of Patent: Nov. 26, 2013

(54) SYSTEM AND METHOD FOR INDUCTIVELY CHARGING A BATTERY

(75) Inventors: David W. Baarman, Fennville, MI (US); John J. Lord, Springfield, IL (US); Nathan P. Stien, West Des Moines, IA (US)

(73) Assignee: Access Business Group International LLC, Ada, MI (US)

( * ) Notice: Subject to any disclaimer, the term of this patent is extended or adjusted under 35 U.S.C. 154(b) by 219 days.

(21) Appl. No.: 13/183,805

(22) Filed: Jul. 15, 2011

(65) Prior Publication Data

US 2011/0267002 A1 Nov. 3, 2011

Related U.S. Application Data

(63) Continuation of application No. 11/855,710, filed on Sep. 14, 2007, now Pat. No. 8,004,235.

(60) Provisional application No. 60/827,586, filed on Sep. 29, 2006.

(51) Int. Cl.
*H02J 7/00* (2006.01)

(52) U.S. Cl.
USPC ........................................................ 320/108

(58) Field of Classification Search
USPC ........................................................ 320/108
See application file for complete search history.

(56) References Cited

U.S. PATENT DOCUMENTS

| | | |
|---|---|---|
| 4,076,996 A | 2/1978 | Maehara et al. |
| 5,367,242 A | 11/1994 | Hulman |
| 5,455,466 A | 10/1995 | Parks et al. |
| 5,596,567 A | 1/1997 | deMuro et al. |
| 5,600,225 A | 2/1997 | Goto |
| 5,734,254 A | 3/1998 | Stephens |
| 5,796,334 A | 8/1998 | Chen et al. |
| 5,896,278 A | 4/1999 | Tamura et al. |
| 5,952,814 A | 9/1999 | VanLerberghe |
| 5,963,012 A | 10/1999 | Garcia et al. |

(Continued)

FOREIGN PATENT DOCUMENTS

| | | |
|---|---|---|
| EP | 0267009 | 5/1988 |
| EP | 1022840 | 7/2000 |

(Continued)

OTHER PUBLICATIONS

Written Opinion and Search Report for International Application No. PCT/IB2007/053834, International Filing Date Sep. 20, 2007.

*Primary Examiner* — Richard V Muralidar
(74) *Attorney, Agent, or Firm* — Warner Norcross & Judd LLP

(57) ABSTRACT

An inductive charging system for recharging a battery. The system includes a charger circuit and a secondary circuit. The secondary circuit includes a feedback mechanism to provide feedback to the charger circuit through the inductive coupling of the primary coil and the secondary coil. The charger circuit includes a frequency control mechanism for controlling the frequency of the power applied to the primary coil at least partly in response to the feedback from the feedback mechanism.

18 Claims, 7 Drawing Sheets

(56) References Cited

U.S. PATENT DOCUMENTS

| | | |
|---|---|---|
| 6,057,668 A | 5/2000 | Chao |
| 6,118,249 A | 9/2000 | Brockmann et al. |
| 6,184,651 B1 | 2/2001 | Fernandez et al. |
| 6,844,702 B2 | 1/2005 | Giannopoulos et al. |
| 6,912,137 B2 | 6/2005 | Berghegger |
| 6,934,167 B2 | 8/2005 | Jang et al. |
| 7,521,890 B2 * | 4/2009 | Lee et al. .................. 320/108 |
| 2002/0154518 A1 | 10/2002 | Elferich et al. |
| 2003/0214821 A1 | 11/2003 | Giannopoulos et al. |
| 2005/0068019 A1 | 3/2005 | Nakamura et al. |
| 2006/0202665 A1 | 9/2006 | Hsu |
| 2007/0042729 A1 | 2/2007 | Baarman et al. |
| 2007/0228833 A1 | 10/2007 | Stevens et al. |
| 2009/0033280 A1 | 2/2009 | Choi et al. |

FOREIGN PATENT DOCUMENTS

| | | |
|---|---|---|
| EP | 1096638 | 5/2001 |
| GB | 2394843 | 5/2004 |
| GB | 2414120 A | 11/2005 |
| JP | 0910307 | 4/1997 |
| JP | 2001225129 | 8/1998 |
| JP | 11-283854 | 10/1999 |
| JP | 2000-011106 | 1/2000 |
| JP | 2005-267643 | 9/2005 |
| JP | 2006-074848 | 3/2006 |
| WO | 9428560 | 12/1994 |
| WO | 0054387 | 9/2000 |
| WO | 2004038888 A2 | 5/2004 |
| WO | 2005/109597 | 11/2005 |

\* cited by examiner

US 8,593,105 B2

SYSTEM AND METHOD FOR INDUCTIVELY CHARGING A BATTERY

BACKGROUND OF THE INVENTION

Charging of batteries with an inductive power supply is well-known. Inductive charging of batteries for electric automobiles as well as the charging of small electric appliance batteries such as those for toothbrushes has met some amount of success. Because inductive charging does not require a physical connection between the battery and the charger, the charging is considerably more convenient. However, not all batteries are easily charged inductively. Lithium-ion batteries (Li-Ion) are one such type of battery.

Recharging Li-Ion batteries is not as straightforward as that of other batteries. Li-Ion batteries are unable to absorb an overcharge. If a constant current is applied to a fully charged Li-Ion battery, metallic lithium plating may develop which could lead to failure of the battery. Thus, care should be taken not to overcharge the battery.

Conversely, charging a Li-Ion battery to full capacity presents some difficulty. The maximum voltage of a Li-Ion battery can be attained relatively quickly during recharging by applying a constant current to the battery. However, when the Li-Ion battery reaches a maximum voltage, the Li-Ion battery may not be fully charged. Without further charging, the battery will only be approximately 65% charged. If a constant current is continually applied to the battery after the battery has reached its maximum voltage, then the battery could be overcharged, which could lead to premature battery failure.

Conventional battery chargers have been developed to fully charge a Li-Ion battery. Generally, the battery charger uses a constant current, constant voltage schema to charge the battery. A discharged battery is first charged at a constant current level in the range of 0.1C to 1C amperes, where C is the battery capacity in amp-hours, until the battery reaches the desired voltage of about 4.2 volts. At this point, the battery charger switches to a constant voltage mode, providing the sufficient power to maintain the battery at this final voltage while providing additional charging to the battery.

The charging profile for a typical Li-Ion battery is shown in FIG. 1. A constant current is applied for a predetermined period. During this phase, the charging of the Li-Ion battery is generally constant. For a typical battery, this phase lasts somewhat less than one hour. The Li-Ion battery eventually exhibits a constant voltage near a preferred voltage prior to attaining a full charge. A constant voltage is then applied to the Li-Ion battery. After approximately an hour of charging with a constant voltage, the battery has typically attained its maximum charge.

If the charging of a Li-Ion battery does not follow the charging profile shown in FIG. 1, then there is a risk that the battery will not be fully charged or that the charging will damage the battery.

The charging of a Li-Ion battery is further complicated because the battery is often not fully discharged before charging. If some residual charge remains on the battery, then optimal charging may require some amount of constant current charging followed by constant voltage charging, or, alternatively, the optimal charging may require only constant voltage charging. For better performance, the battery charger should provide a mechanism for compensating for the charge state of the battery.

Charging Li-Ion batteries is especially problematic where inductive charging is used. In an inductive battery charger, a primary coil located in the charger provides power to an inductive secondary located in the battery. The voltage across the secondary is then rectified and applied to the battery to recharge the battery. There is no direct physical connection between the battery and the battery charger. Because there is no physical connection between the battery and the battery charger, information regarding the state of the battery is not readily available to the battery charger.

At the same time, portable devices need to be lightweight. Thus, complex circuitry to monitor the charge state of the battery and relay that information to the inductive charger increases the cost, size and weight of the portable device.

An inductive system capable of charging a battery having a unique charge cycle while using a relatively simple circuit directly coupled to the battery is highly desirable.

SUMMARY OF THE INVENTION

An inductive system for recharging a battery, such as a Li-Ion battery, having a unique charging cycle generally includes a charger circuit having a primary coil for inductively supplying charging power and a secondary circuit for inductively receiving the charging power and applying that power to a battery. The secondary circuit includes a feedback mechanism to provide feedback to the charger circuit through the inductive coupling of the primary coil and the secondary coil. The charger circuit includes a frequency control mechanism for controlling the frequency of the power applied to the primary coil at least partly in response to the feedback from the feedback mechanism.

In one embodiment, the feedback mechanism includes a subcircuit for varying the reflected impedance of the secondary circuit. In this embodiment, the charger circuit may include a feedback detector for monitoring a characteristic of the power in the charger circuit that varies at least in part in response to changes in the reflected impedance of the secondary circuit. In this embodiment, the feedback detector may be coupled to the primary coil to allow the controller to monitor the current through the primary coil.

In one embodiment, the feedback mechanism includes an over-voltage detector or an over-current detector, or both. In this embodiment, the detectors may be arranged so as to control one or more switches, such as transistors. If either an over-voltage condition or an over-current condition is detected in the secondary circuit, then the switch is turned on and the current from the secondary coil is shunted from the battery through a resistor. In this way, the battery is protected from significant exposure to over-voltage or over-current conditions. The feedback mechanism may be directly coupled to the battery.

In one embodiment, the feedback detector is a current sensor coupled to the primary tank circuit. In this embodiment, when the current is shunted through the feedback signaling resistor in the secondary, the current through the secondary coil increases, which varies the reflected impedance of the secondary circuit resulting in increased current through the primary coil. The increase in current through the primary coil is detected by the current sensor in the primary circuit, which could include a peak detector, thereby providing to the controller a feedback signal for detecting whether the battery is in an over-voltage or over-current state. In one embodiment, the frequency control mechanism makes appropriate adjustments to the frequency to correct the over-voltage or over-current state by reducing the power supplied to the secondary coil.

In one embodiment, the charger circuit includes an inverter and a tank circuit. In this embodiment, the operating frequency of the inverter is reduced to move the frequency of the power applied to the primary coil closer to the resonant frequency of the tank circuit, while the operating frequency of the inverter is increased in order to move the frequency of the power applied to the primary coil away from the resonant frequency of the tank circuit. It would be equally possible to arrange the system such that an increase in the inverter frequency would move the power applied to the primary coil closer to resonance and thereby increase power transfer while a decrease in inverter frequency would move the power applied to the primary coil farther from the resonant frequency of the tank circuit and thereby decrease the power transfer.

In another aspect, the present invention also provides a method for operating an inductive charging system having a charger circuit with a primary coil and a secondary circuit with a secondary coil. The method generally includes the steps of detecting whether a battery is present in the secondary circuit and charging the battery by way of one or more charging cycles. The charging step generally includes the steps of: applying power to a primary coil at a frequency, evaluating feedback from the secondary circuit through the primary coil and secondary coil inductive coupling and adjusting the frequency of the power applied to the primary coil as a function of the feedback from the secondary circuit. In this way, the frequency of the power applied to the primary coil is changed in order to optimize the charging for the battery. Several charging cycles may be necessary to fully charge the battery.

In one embodiment, the method is utilized with a charger circuit having a tank circuit. In this embodiment, the charging cycle may include the alternative steps of moving the power applied to the primary coil closer to the resonant frequency of the tank circuit or moving the power applied to the primary coil farther from the resonant frequency of the tank circuit. The charger circuit may include an inverter. In such embodiments, the steps of moving the frequency of the power applied to the primary coil may be further defined as moving the operating frequency of the inverter.

In one embodiment, the charging step generally includes the steps of: applying power to the primary coil at a specific frequency; determining whether a feedback signal from the charger circuit is received by the charger circuit; and varying the frequency of the power applied to the primary coil as a function of the feedback signal to either increase or decrease the power delivered to the secondary circuit. In one embodiment, the step of varying the frequency is further defined as including the steps of: moving the frequency of the power applied to the primary coil farther from resonance if a feedback signal from the feedback mechanism is received or moving the frequency of the power applied to the primary coil closer to resonance if a feedback signal from the feedback mechanism is not received.

In one embodiment, the charging step generally includes the steps of incrementally moving the frequency of the power applied to the primary coil closer to resonance until a feedback signal is received; after a feedback signal is received, incrementally moving the frequency of the power applied to primary close farther from resonance until a feedback signal is no longer received; and applying power to the primary coil at the frequency for a charging period. The process may be repeated.

In one embodiment, the step of determining whether a feedback signal is received includes the steps of sensing the current in the charger circuit and comparing the sensed current with a predetermined threshold.

In one embodiment, the method further includes the step of terminating the charging cycle when the time for completing one charging cycle is less then a minimum charging cycle time. The method may further include the step of terminating the charging cycle when the frequency of the power applied to the primary coil meets an upper and/or lower threshold.

In one embodiment, the detecting step further includes the steps of: applying a pulse of power to the primary coil at a predetermined probe frequency, sensing the reflected impedance, and determining whether a battery is present as a function of the sensed reflected impedance.

The present invention provides a simple and effective inductive charging circuit that permits nonlinear charging profiles to be implemented in an inductive system with a small number of components. The over-current and over-voltage detectors not only provide feedback used to drive the frequency of the charging power, but also protect the battery from potential harmful power conditions. The charging profile can be easily changed by varying a number of stored values that dictate operation of the system. The present invention is well-suited for use in charging portable electronic devices, such as cell phones, personal digital assistants, handheld gaming devices, personal media players and other similar devices. In this context, the secondary circuit may be incorporated into the portable electronic device so that the device can be placed in close proximity to the charger circuit for charging, thereby eliminating the need to plug the device into a charger.

These and other objects, advantages, and features of the invention will be more fully understood and appreciated by reference to the description of the current embodiment and the drawings.

DESCRIPTION OF THE CURRENT EMBODIMENT

Figure 2:
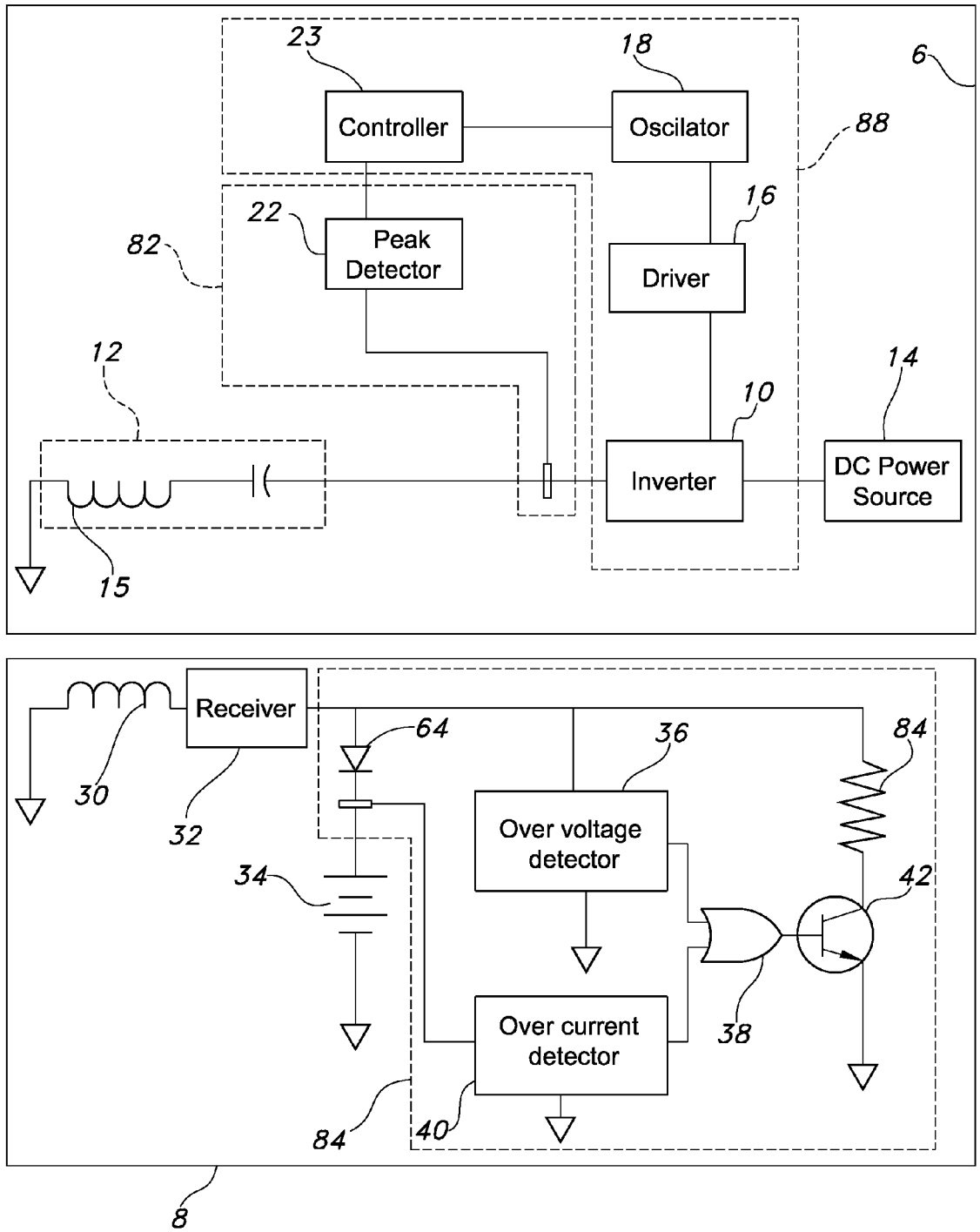
FIG. 2 shows a system for inductive charging of a battery.

An inductive charging system in accordance with an embodiment of the present invention in shown in FIG. 2. The inductive charging system 4 is configured to inductively charge a battery having a nonlinear charging profile, such as a Li-Ion battery. The system 4 generally includes a charger circuit 6 and secondary circuit 8. The charger circuit 6 generally includes a primary coil 15, a frequency controller 80 for applying power to the primary coil at a desired frequency and a feedback detector 82 for receiving feedback from the secondary circuit 8. The secondary circuit 8 generally includes a secondary coil 30 for receiving inductive power from the charger circuit 6 and a feedback mechanism 84 for providing feedback to the charger circuit 6 indicative of the voltage or current in the secondary circuit 8. The frequency controller 80 varies the frequency of the power applied to the primary coil 15 as a function of the feedback from the secondary circuit 8. Although described in connection with the charging of a conventional Li-Ion battery, the present invention is well suited for use in charging other types of batteries, including batteries having different charging profiles.

As noted above, the charger circuit 6 generally includes a frequency controller 80, a primary coil 15, and a feedback detector 82. In the illustrated embodiment, the frequency controller 80 includes a controller 20, an oscillator 18, a driver 16 and an inverter 10. In this embodiment, these components collectively drive a tank circuit 12. More specifically, the inverter 10 provides AC (alternating current) power to the tank circuit 12 from a source of DC (direct current) power 14. The tank circuit 12 includes the primary coil 15. The tank circuit 12 may be either a series resonant tank circuit or a parallel resonant tank circuit. In this embodiment, the driver 16 provides the signals necessary to operate the switches within the inverter 10. The driver 16 in turn operates at a frequency set by the oscillator 18. The oscillator 18 is, in turn, controlled by the controller 20. The controller 20 could be a microcontroller, such as a PIC18LF1320, or a more general purpose microprocessor. Although shown as essentially discrete devices in the illustrated embodiment, the driver 16, oscillator 18 and could alternatively be integrated and could be implemented as modules within the controller 20.

In the illustrated embodiment, the feedback detector 82 detects the current in the tank circuit 12. In operation, the controller 20 uses signals from the peak detector 22 to assist in determining the frequency of operation for the oscillator 18, and thereby the frequency of the inverter 10. Although the feedback detector 82 of the illustrated embodiment detects current in the tank circuit 12, other characteristics of the power in the charger circuit 6 may be evaluated to provide charge information regarding the battery.

The secondary circuit 8 generally includes a secondary coil 30, a rectifier 32, and a feedback mechanism 84. The secondary coil 30 inductively receives power from the primary coil 15. The rectifier 32 provides DC power to charge the battery 34. In this embodiment, the feedback mechanism 84 is configured to provide feedback when the current applied to the battery 34 exceeds a threshold value or when the voltage applied to the battery 34 exceeds a threshold value. As shown, the feedback mechanism of this embodiment generally includes an over-voltage detector 36, an over-current detector 40, an OR gate 38, a switch 42, and a resistor 44. The output of an over-voltage detector 36 indicates whether the voltage across the battery 34 is above a predetermined level. Similarly, the output of an over-current detector 40 indicates whether the current to the battery 34 is above a predetermined amount. The output of the current detector 40 as well as the output of the voltage detector 36 are coupled to the inputs of an OR gate 38. The OR gate 38 could be a discrete circuit, or it could be a connection between the outputs of the detectors. The output of the OR gate 38 is coupled to the switch 42. The switch 42 is controlled by the output of the OR gate 38 and is connected in series between the rectifier 32 and the resistor 44. The switch 42 could be any suitable switch such as a bipolar transistor, a field effect transistor, or an insulated gate bipolar transistor. The resistor 44 is connected in series between the switch 42 and ground.

In operation, if the output of the over-voltage detector 36 or the output of the over-current detector 40 indicate an over-voltage or an over-current situation, then the output of the OR gate 38 turns on the switch 42. When the switch 42 is on, current from the rectifier 32 flows through the resistor 44 to ground.

Because the impedance of the resistor 44 is much less than the impedance of the battery 34, a current surge occurs through the resistor 44, thereby causing a current surge through the secondary coil 30. The diode 64 prevents the battery 34 from supplying any current when the switch 42 is turned on. The current surge through the secondary coil 30 creates a similar current surge in the charger circuit 6 through the primary coil 15. The current surge is detected by the peak detector 22. The controller 20 then changes the frequency of the oscillator 18.

Figure 1:
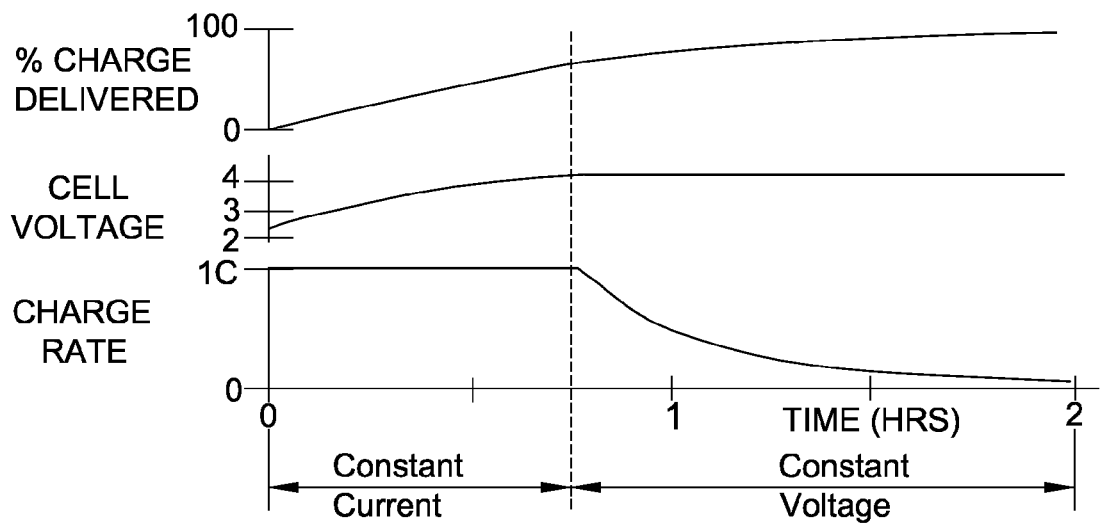
FIG. 1 shows the charging profile for a typical Li-Ion battery.
Figure 3:
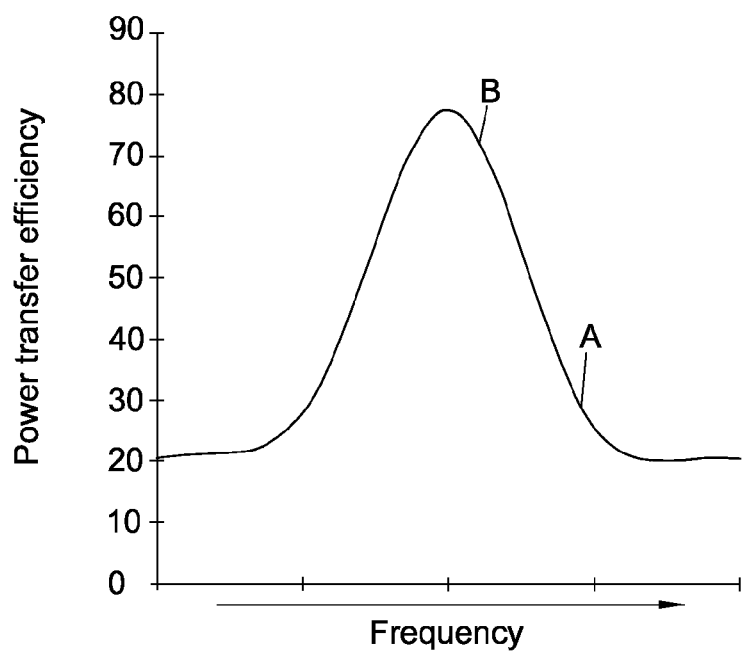
FIG. 3 is a power transfer curve between a primary coil and a secondary coil.

In the illustrated embodiment, the primary coil 15 and the secondary coil 30 are loosely coupled. Because the two are loosely coupled in this embodiment, the slope of the power transfer curve about the resonant frequency is not as steep as if the coils 15, 30 were tightly coupled. An exemplary power transfer curve for the coils 15, 30 is shown in FIG. 3. In this embodiment, the power transfer is highest when the inverter 10 is operating at resonance. However, even if the inverter 10 is not operating at resonance, significant power transfer can occur when the inverter is operating off-resonance. Generally, the inverter 10 is operated between frequency A and frequency B. Frequency B is somewhat less than the resonant frequency. Between frequency A and frequency B, the power transfer curve can be piece-wise linearized by a software lookup table located in the controller 20. Thus, a decrease in the operating frequency of the inverter 10 will result in a generally predictable increase in the power transferred from the primary coil 15 to the secondary coil 30. As can be seen by the graph, it would be equally effective to use an operating frequency less than the resonant frequency. If so, then an increase in the operating frequency would lead to an increase in the power transfer, and vice-versa.

Figure 4A:
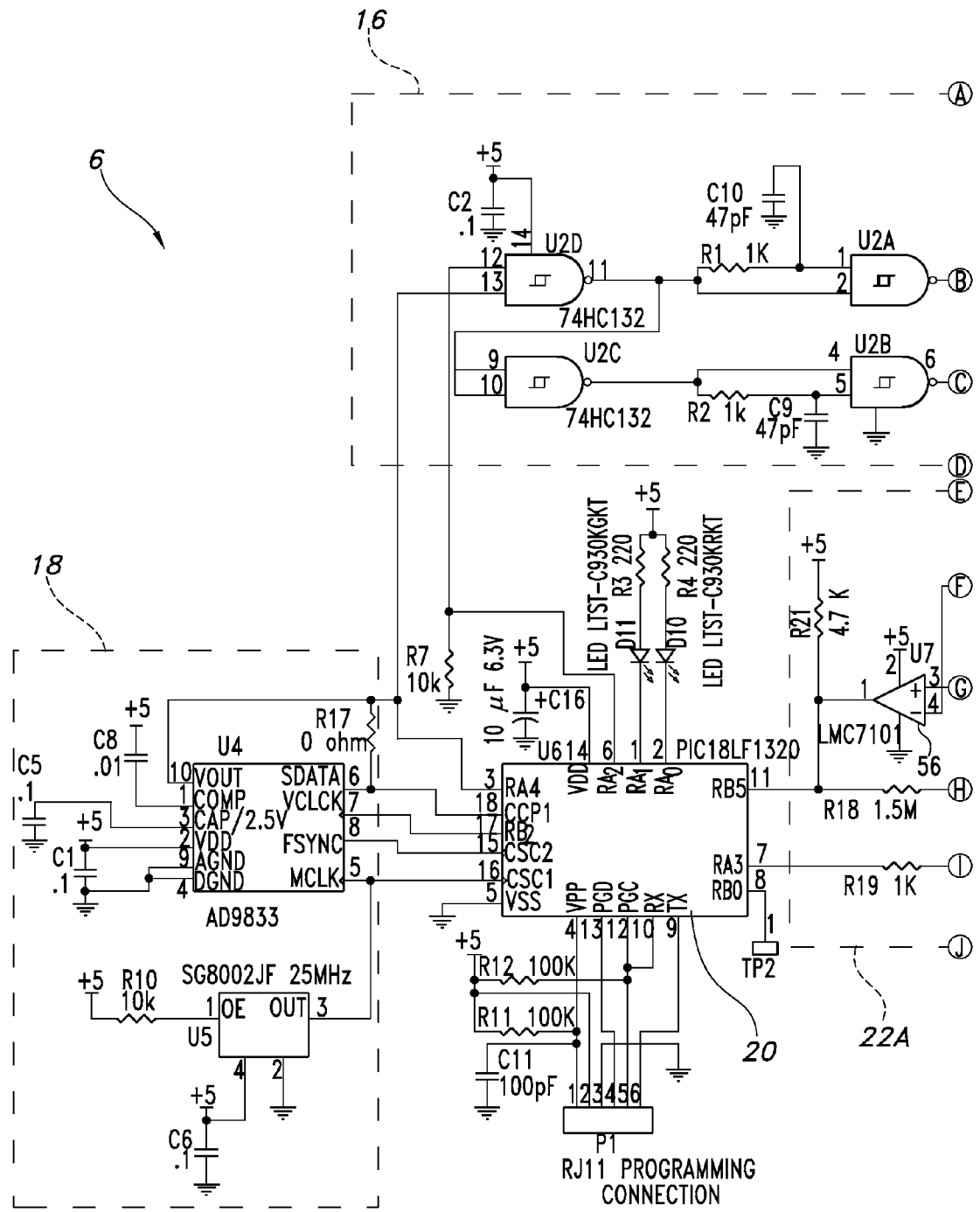
FIG. 4 shows a circuit diagram corresponding to the block diagram of FIG. 2 for the charger circuit.
Figure 4B:
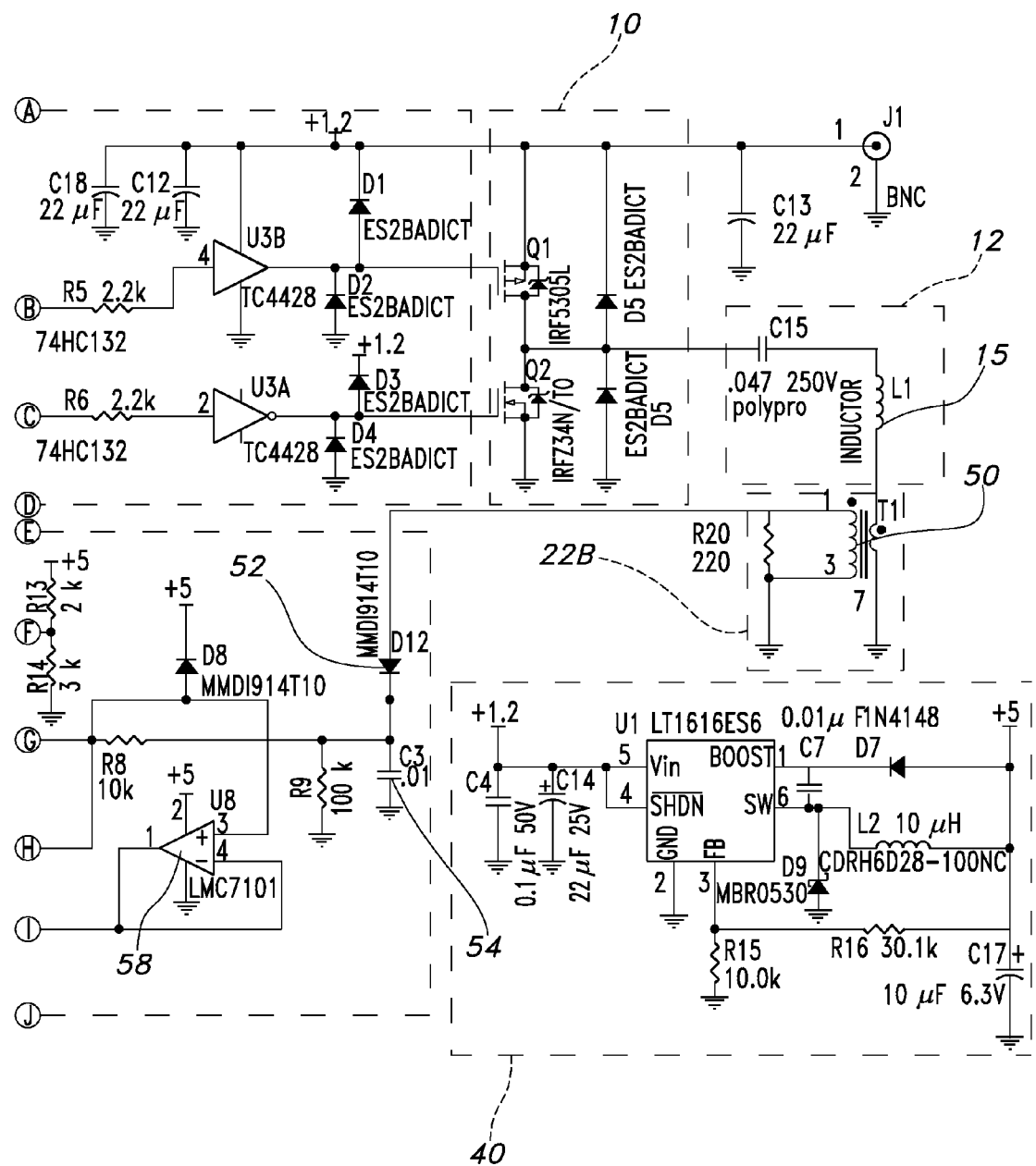

FIG. 4 shows a circuit diagram corresponding to the block diagram of FIG. 2 for the charger circuit 6 of the system. The peak detector 22 (comprised of 22A and 22B) is connected in series with the primary coil 15 and provides a signal by way of the transformer 50 that is proportional to the current through the primary coil 15. The signal is rectified by a diode 52 and then used to charge capacitor 54. The operational amplifiers 56, 58 are used to smooth the signal for sampling by the controller 20. This particular circuit diagram is exemplary and is not intended to limit the scope of the invention to a specific circuit design.

Figure 5:
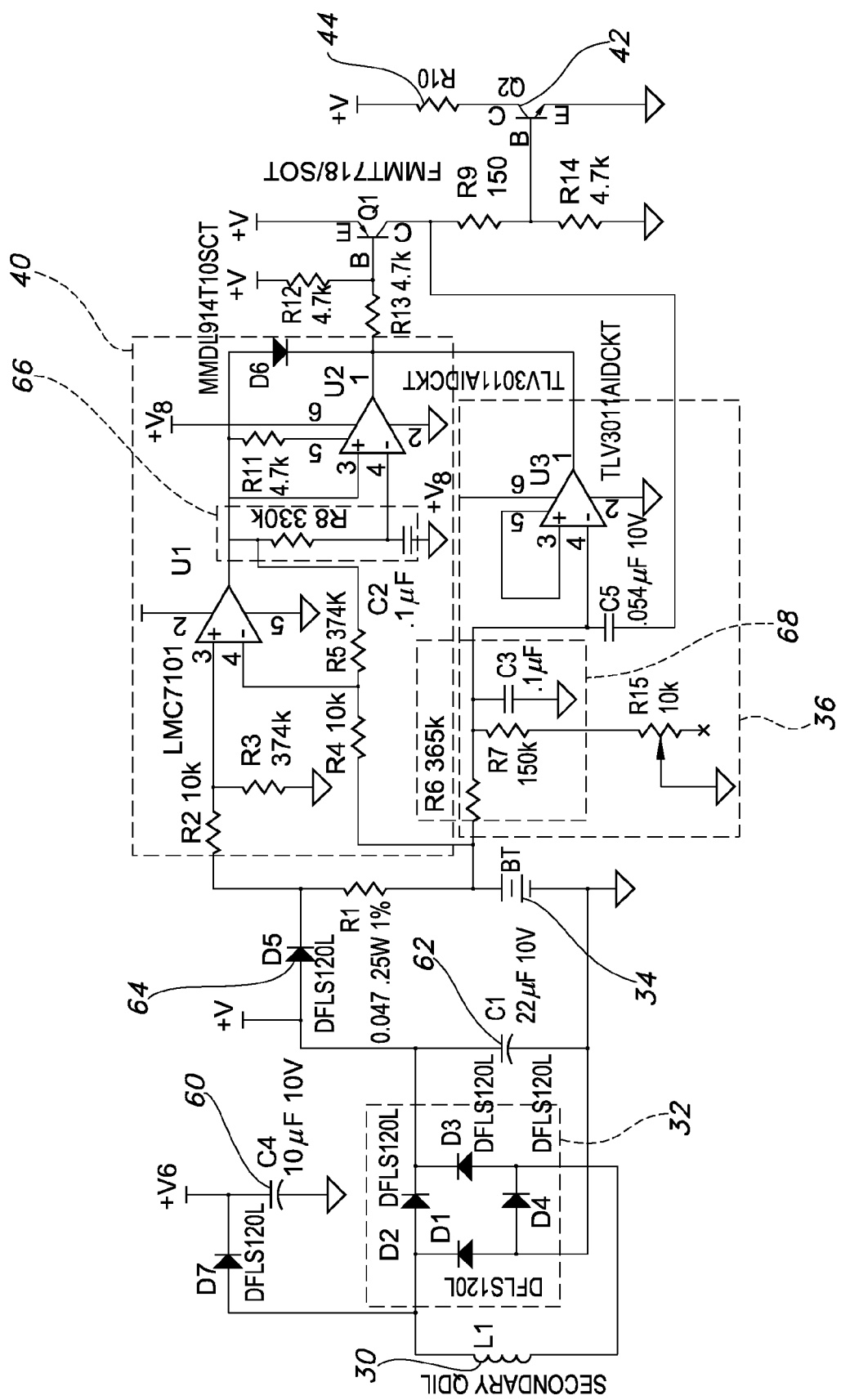
FIG. 5 shows a circuit diagram corresponding to the block diagram of FIG. 2 for the battery side.

FIG. 5 shows a circuit diagram for the secondary circuit 8 of the system. As with the charger circuit diagram of FIG. 4, the secondary circuit diagram of FIG. 5 is exemplary and not intended to limit the scope of the invention to a specific circuit design. Power from the secondary coil 30 is used to charge capacitor 60, which in turn is used as the power supply for the circuitry connected to the battery 34. A rectifier 32 produces a DC current from the AC current supplied by secondary coil 30. A capacitor 62 is charged to provide a DC power source for charging the battery 34. A blocking diode 64 prevents the battery 34 from discharging when the secondary coil 30 is not receiving power or when the feedback mechanism is signaling an over-voltage or over-current condition.

If either the over-voltage detector 36 or the over-current detector 40 determines that too much voltage or too much current is applied to the battery 34, then the transistor 42 is turned on, thereby discharging the capacitor 62 through the resistor 44, resulting in a lower voltage across the battery 34. In this embodiment, the secondary circuit 8 includes a blocking diode 64 that prevents current from flowing into the capacitor 62 from the battery 34.

When the current flows through the resistor 44, additional current is drawn from the secondary coil 30, which in turn causes an increase in current through the primary coil 15.

Because the voltage drops across the capacitor 62, the voltage across the battery 34 drops as does the current through battery 34. Thus, the over-voltage condition or the over-current condition is corrected. The detectors 36, 40 are cleared, thereby causing the transistor 42 to turn off. The period the transistor 42 is turned on due to an over-current or an over-voltage condition to the time the transistor is turned off due to a correction of the over-current or over-voltage condition is the signal time.

In this illustrated circuit design, the duration of the signal time is controlled by two RC circuits 66, 68 within the detector circuits 36, 40. In this embodiment, the voltage detector 36 is configured to have a hysteresis of about 80 mV to reduce oscillation when the battery 34 voltage is near an over-voltage condition.

Figure 6:
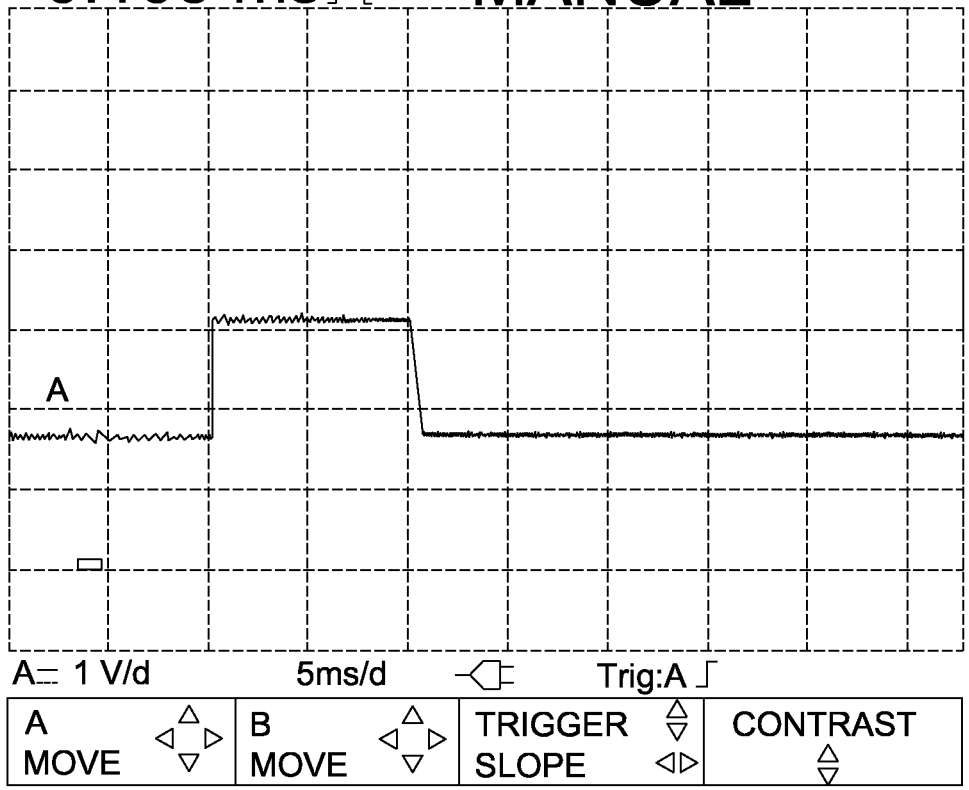
FIG. 6 shows the output of the peak detector caused by the increased current through the secondary coil.

As stated, when the transistor 42 is turned on, increased current flows through the secondary coil 30, causing increased current flow through the primary coil 15. This increase in current is detected by the peak detector 22. The output of the peak detector caused by the increased current through the primary coil is shown in FIG. 6. The output of the peak detector in the illustrated embodiment increases by about 1.55V for about 10 ms. The characteristics of this signal may vary from application to application depending on the characteristics of the circuit components. For example, the magnitude of the increase and the length of the increased signal may be controlled as desired.

The controller 20 continuously samples the output of the peak detector 22. When a sudden increase is detected, an internal flag referred to as FB_flag is set. When a decrease is detected, FB_flag is cleared. However, a copy of FB_flag referred to hereinafter as FB_latch is also set. FB_latch is not cleared when a decrease is detected. It can only be cleared by the controller 20. FB_latch therefore can be checked periodically by controller 20 to determine whether an over-voltage condition or an over-current condition occurred during a given period of time. Thus, the system provides a feedback mechanism to the controller.

A user of a portable device may remove the device from the charger circuit 6 before it is fully charged. Additionally, the user may place the device in the charger before the battery is full discharged. In order to optimally charge the battery, the inductive battery charger may detect the presence of the battery as well as compensate for the unique charging profile for a battery.

Figure 7:
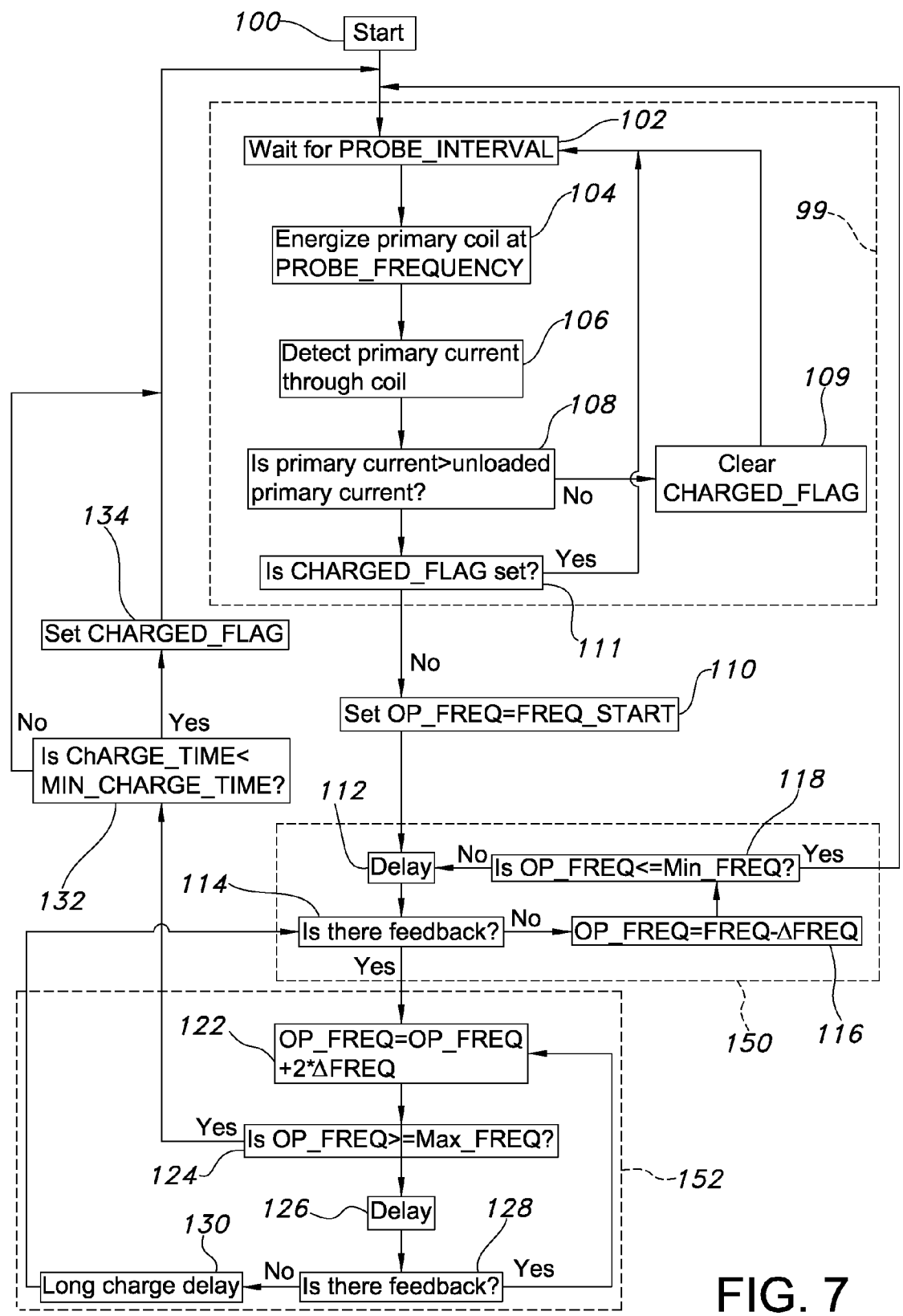
FIG. 7 is a flow chart for a method of operating a battery charger.

FIG. 7 is a flow chart showing one embodiment of the process for detecting whether the secondary circuit 8 is proximal to the charger circuit 6 and for optimally charging the battery if the secondary circuit 8 is present.

The process starts. Step 100. The probing process 99 is commenced. The controller 20 waits for a predetermined time period of PROBE_INTERVAL. Step 102. After PROBE_INTERVAL has elapsed the controller 20 causes the inverter 10 to produce a low frequency current at PROBE_FREQUENCY through the primary coil 15. Step 104. The current through the primary coil 15 is detected. Step 106.

If the secondary circuit 8 is present, then the probe by the charger circuit 6 will induce a probe current in the secondary coil 30. The battery 34 will not be damaged even if it is fully charged at the time of the probe. First, the probe is of a short duration on the order of 10 to 20 milliseconds, in this embodiment, while the quiescent period is usually several seconds long. Additionally, the over-voltage detector 36 and the over-current detector 40 by way of transistor 42 will shunt excessive probe current through the resistor 44 rather than through the battery 34.

In this embodiment, the amount of current through the primary coil at the PROBE_FREQUENCY has been previously determined experimentally and saved into the memory of the controller. If the current through the primary coil 15 is approximately equal to the predetermined unloaded primary current (Step 108), then the secondary circuit 8 is not present in the secondary circuit 8. The CHARGED_FLAG is cleared. Step 109. The system then waits for another PROBE_INTERVAL before starting the process again.

If the current flowing through the primary coil 15 is not approximately equal to the predetermined unloaded primary current, then the secondary circuit 8 is present.

The CHARGED_FLAG is then checked. Step 111. The CHARGED_FLAG indicates whether the battery is fully charged. If the CHARGED_FLAG is not set, then the charging process begins.

The frequency of the inverter is set by the controller 20 to FREQ_START. Step 110. The system then delays for a predetermined period of time to eliminate any transients. Step 112.

The controller 20 then determines whether a feedback signal, discussed previously, has been received. If not, then the frequency is decreased by ΔFREQ. Step 116. In this embodiment, a decrease in the frequency moves the system toward resonance, and therefore increases the power transfer from the charger circuit 6 to the battery 34.

ΔFREQ could be a constant, or it could be determined by obtaining the value from a lookup table indexed by the operating frequency of the inverter at the particular time ΔFREQ is used. The values selected for ΔFREQ may be frequency dependent and chosen so that if the operating frequency is reduced or increased by ΔFREQ, then the corresponding increase or decrease in current is the approximately the same for ΔFREQs for all operating frequencies. For example, if the charger circuit 6 is operating near the resonant frequency of the tank circuit 12, then a decrease in the operating frequency by 100 Hz will substantially increase the current through the tank circuit 12. If, on the other hand, the charger circuit 6 is operating relatively far from resonance, then a change of 100 Hz will not result in a substantial increase in the current through the primary. ΔFREQ may therefore be chosen to cause approximately the same change in primary current at a low frequency or a high frequency The frequency is then compared with Min_FREQ. Step 118. Min_FREQ is the predetermined minimum operating frequency for the inverter. Generally, Min_FREQ is somewhat greater than the resonant frequency for the tank circuit 12. If the frequency is less than or equal to that of Min_FREQ, then the controller 20 returns to probing. If not, then the controller 20 waits for a predetermined period time (Step 112) and then checks for the occurrence of a feedback signal. Step 114.

Thus, as long as no feedback signal is detected by the controller 20, the frequency of the inverter 10 is repeatedly reduced so as to maximize power transfer to the battery 34.

If a feedback signal is detected, then the power transfer to the battery 34 should be reduced. The frequency is therefore increased by an amount equal to twice the value of ΔFREQ, which again could be obtained from a look-up table. Step 122. The frequency is compared with Max_FREQ. Step 124. Max_FREQ is a predetermined value indicating the maximum frequency for operating the inverter. If the frequency will be greater than a predetermined maximum frequency Max_FREQ, then the charger circuit 6 returns to the probing process 99. If not, the controller 20 waits (step 126) and then checks for a feedback signal. Step 128.

If a feedback signal has been detected, then the inverter frequency is again decreased by twice the value of ΔFREQ. Step 122. The process then continues. On the other hand, if no feedback signal is detected, then the system waits while power at the then-current frequency is applied to the primary coil 15. Step 130. The long charge delay of step 130 is generally much larger than the delays of step 112 or step 126. The long charge delay allows a substantial amount power to be provided to the battery 34.

Thus, as the charge on the battery 34 is increased and a feedback signal is detected, then the system gradually increases the operating frequency of the inverter 10, thereby reducing the power transferred to the battery 34. The increase in the operating frequency continues until feedback signals are no longer received, in which case power is provided to the battery 34 over a longer period of time, thereby allowing the battery 34 to charge to a maximum.

Returning to step 124, if the operating frequency is greater than the Max_FREQ, then the controller 20 compares CHARGE_TIME with MIN_CHARGE_TIME. Step 132. CHARGE_TIME is the length of elapsed time for the previous charging cycle, while MIN_CHARGE_TIME is the minimum desired time for a charge cycle. If the CHARGE_TIME is less than the MIN_CHARGE_TIME, then the battery 34 is considered to be fully charged, and the CHARGED_FLAG is then set. Step 134. Additionally, an LED may be turned on to indicate to a user that the battery 34 is fully charged.

The system may be configured to address fault conditions. In one embodiment, the controller 20 may include a counter that is incremented each time an entire charge cycle occurs without generating a feedback signal. When the value of the counter is greater than the predetermined maximum number of faults, the system enters an irrevocable fault state. The controller 20 may then deactivate the drive signal, and may enable a red LED to flash rapidly. In this embodiment, the charger circuit 6 can only be returned to operation by power cycling the charger. That is, the charger circuit 6 must be disconnected from the external power source.

Further, if the feedback drives the frequency above a predetermined safe frequency, designated as FREQ_TRIGGER_SAFE, then the minimum frequency is set to FREQ_MIN_SAFE. If the algorithm would take it lower than this level, the system continues to probe as usual. If there is a fault within the system, the fault condition will occur and the charger circuit 6 will be disabled until the charger circuit 6 is power cycled.

Although the present invention is described in connection with an embodiment in which changes in the impedance of the secondary circuit (for example, resulting from changes in resistance) are used to generate a feedback signal, the present invention is not limited to the feedback methodology of the illustrated embodiment. The present invention may utilize, among other things, changes in resistance, capacitance and/or inductance in series or parallel configurations to generate the feedback signal.

The above descriptions are those of current embodiments of the invention. Various alterations and changes can be made without departing from the spirit and broader aspects of the invention.

The embodiments of the invention in which an exclusive property or privilege is claimed are defined as follows:

1. A method of operating an inductive charger circuit for supplying power to an object via an inductive coupling, the inductive charger circuit having a primary circuit, said method comprising the steps of:
   probing for presence of the object by supplying power to the primary circuit and sensing an amount of power supplied to the primary circuit;
   determining if the sensed amount of power is approximately equal to a predetermined threshold;
   based on the sensed amount of power being approximately equal to the predetermined threshold, setting a charge status to indicate the battery is not fully charged;
   checking the charge status;
   supplying power to the primary circuit at an operating frequency in order to charge the battery of the object if (i) the sensed amount of power is not approximately equal to the predetermined threshold and (ii) the charge status indicates the battery is not fully charged; and
   repeating said probing and said determining steps if (i) the sensed amount of power is not approximately equal to the predetermined threshold and (ii) the charge status indicates the battery is fully charged.

2. The method of claim 1, wherein said probing includes supplying power to the primary circuit at a predetermined probing frequency.

3. The method of claim 1, wherein the charge status is a status of a charge flag.

4. The method of claim 1, wherein the predetermined threshold is an unloaded primary current.

5. The method of claim 1, wherein the sensed amount of power is approximately greater than the predetermined threshold when the object is in proximity to the inductive charger circuit.

6. The method of claim 1, wherein the object is a secondary circuit having the battery for charging via the inductive coupling.

7. The method of claim 1 further including the step of receiving a feedback signal from the secondary circuit in response to a sensed over-voltage condition of the battery or a sensed over-current condition of the battery.

8. The method of claim 7, wherein the object includes a switch to generate the feedback signal to the inductive charging circuit via the inductive coupling, wherein activation of the switch varies a reflected impedance.

9. An inductive charger circuit for supplying power to an object via an inductive coupling, said inductive charger circuit comprising:
   a power source;
   a primary circuit including a primary for supplying wireless power to said object via an inductive coupling;
   a sensor for providing an output indicative of an amount of power in said primary; and
   a controller electrically coupled to said primary circuit and electrically coupled to said power source, said controller configured to apply power at a frequency to said primary from said power source;
   said controller configured to probe for presence of said object by applying power to said primary;
   said controller configured to determine, based on said sensor output, if said amount of power is approximately equal to a predetermined threshold in response to application of power,
   said controller configured to set a charge status to indicate said battery is not fully charged if said sensed amount of power is approximately equal to said predetermined threshold,
   wherein power is supplied to said primary circuit at an operating frequency in order to charge said battery of said object if (i) said sensed amount of power is not approximately equal to said predetermined threshold and (ii) said charge status indicates said battery is not fully charged,
   wherein if (i) said sensed amount of power is not approximately equal to said predetermined threshold and (ii) said charge status indicates said battery is fully charged, said controller repeats application of power to said primary and determines, based on said sensor output, if said amount of power is approximately equal to said predetermined threshold.

10. The inductive charger circuit of claim 9, wherein said controller probes for presence of said object by applying power to said primary at a probing frequency.

11. The inductive charger circuit of claim 9, wherein said predetermined threshold is an unloaded primary current.

12. The inductive charger circuit of claim 9, wherein said sensed amount of power is approximately greater than said predetermined threshold when said object is in proximity to said inductive charger circuit.

13. The inductive charger circuit of claim 9, wherein said sensor is a current sensor, and said sensor output is indicative of a current in said primary.

14. The inductive charger circuit of claim 9, wherein said charge status is a status of a charge flag.

15. The inductive charger circuit of claim 9, wherein said object is a secondary circuit having a battery for charging via said inductive coupling.

16. The inductive charger circuit of claim 15, wherein said secondary circuit generates a feedback signal in response to a sensed over-voltage condition of said battery or a sensed over-current condition of said battery.

17. The inductive charger circuit of claim 15, wherein said object includes a switch to generate a feedback signal to said inductive charging circuit via said inductive coupling, wherein closing of said switch varies a reflected impedance.

18. The inductive charger circuit of claim 17, wherein in response to said switch being closed, a current is shunted through a resistive element of said object, said current results in a change in reflected impedance of said object and an increase in current through said primary, and wherein said sensor detects said increase in current through said primary.

* * * * *